United States Patent [19]
Geyer et al.

[11] Patent Number: 5,240,165
[45] Date of Patent: Aug. 31, 1993

[54] METHOD AND APPARATUS FOR CONTROLLED DEFORMATION BONDING

[75] Inventors: Harry J. Geyer, Phoenix; Ronald M. Lahti, Chandler, both of Ariz.

[73] Assignee: Motorola, Inc., Schaumburg, Ill.

[21] Appl. No.: 909,287

[22] Filed: Jul. 6, 1992

[51] Int. Cl.⁵ .............. B23K 20/00; H01L 21/603
[52] U.S. Cl. .................. 228/102; 228/180.21; 228/6.2; 228/9; 228/44.7
[58] Field of Search ................ 228/102, 103, 180.2, 228/243, 6.2, 9, 44.7

[56] References Cited
U.S. PATENT DOCUMENTS

| | | | |
|---|---|---|---|
| 3,713,575 | 1/1973 | Cushman | 228/180.2 |
| 3,914,850 | 10/1975 | Coucoulas | 228/180.2 |
| 4,918,277 | 4/1990 | Zimmer | 228/180.2 |
| 4,984,730 | 1/1991 | Göbel et al. | 228/9 |
| 5,094,382 | 3/1992 | Shimizu | 228/102 |

*Primary Examiner*—Samuel M. Heinrich
*Attorney, Agent, or Firm*—Miriam Jackson

[57] ABSTRACT

A method of producing reliable bonds of a lead to a bump on a semiconductor chip is accomplished by controlling the amount of deformation of the lead and the bump during bonding. A differential amplifier is used to sense the deformation and stop the application of force to the lead and the bump when a desired amount of deformation of the lead and the bump is obtained.

13 Claims, 1 Drawing Sheet

METHOD AND APPARATUS FOR CONTROLLED DEFORMATION BONDING

BACKGROUND OF THE INVENTION

This invention relates, in general, to a method of bonding leads to a semiconductor chip, including, but not limited to a method of controlling the deformation of the bond.

Tape Automated Bonding (TAB) is usually done by gang bonding of a plurality of leads attached to a tape to bonding surfaces or bumps on a semiconductor chip. This is done utilizing a means for applying heat and a constant force to the plurality of leads of the tape and the bumps on the chip. The means for applying heat and force is a bonding tool, commonly referred to as a thermode, positioned on a TAB bonder. During bonding, the TAB leads and the bumps are deformed by the constant force applied by the bonding tool. The plurality of TAB leads are typically tin plated and the bump is typically gold. A gold-tin eutectic bond is formed between the lead and the bump.

In the past, some TAB bonded devices have experienced some problems in reliability due to factors that vary in the bonding process. Factors that can vary within the bonding process include, among others, bond area and hardness of the materials comprising the lead and the bump.

The bond area varies because the incoming TAB lead size can vary as much as $+/-10\%$ and the bump size can vary as much as $+/-5\%$. This means that the bond area can vary as much as $+/-15\%$. The variation in the bond area generates a $+/-15\%$ variation in stress on the TAB leads bumps and semiconductor chip, because the force applied to the leads by the bonding tool during bonding is constant. This variation in stress causes a large variation in the amount of deformation of the TAB leads and bumps due to the relatively flat slope of the gold modules curve at the bonding temperature, which is typically greater than 300° C. The typical variation in the hardness of the gold bumps is $+/-10\%$. This variation in the hardness of the gold bumps also generates a variation in the stress on the TAB leads and the bumps.

Because of both of these variations, it is necessary for the bonder operators to adjust the bonder force or bonding temperature depending on the variation of the bond area and the hardness of the materials. If the proper adjustments are not made, the TAB leads can be under- or over-bonded, thereby causing rejects. An under-bonded lead is one in which the lead is not deformed enough so that the lead and the bump do not adhere properly. An over bonded lead is one in which the lead is deformed too much, which can result in reduced bond strength and shorting of the lead to other parts of the semiconductor chip.

SUMMARY OF THE INVENTION

A method of bonding is comprised of the steps of providing a lead and a bonding surface formed on a semiconductor chip adjacent to the lead. Bonding the lead and the bonding surface together by deforming the lead and the bonding surface a constant amount.

The method of the present invention is carried out by using a bonding apparatus, comprised of a bonder frame, and a first stage movably mounted to the bonder frame, having a means for moving a first distance in a first vertical direction with respect to a ground surface. A means for determining the position of the first stage relative to a fixed point is coupled to the first stage. A second stage is movably mounted to the first stage, having a means for moving a second distance in a second vertical direction opposite that of the first vertical direction. A means for applying a force to a lead and a bonding surface of a semiconductor chip to be bonded together is mounted to the second stage. A means for determining the position of the second stage relative the the first stage is coupled to the second stage. A means for sensing when the means for applying force touches the lead and for algebraically adding the first vertical distance and the second vertical distance and for stopping the movement of the first stage when the result of the algebraic addition of the first distance and the second distance is equal to a constant amount of deformation of the lead and the bonding surface by the means for applying force is coupled to the means for determining the position of the first stage, the means for determining the position of the second stage, and the means for moving the first stage a first distance.

DETAILED DESCRIPTION OF THE DRAWINGS

Figure 1:
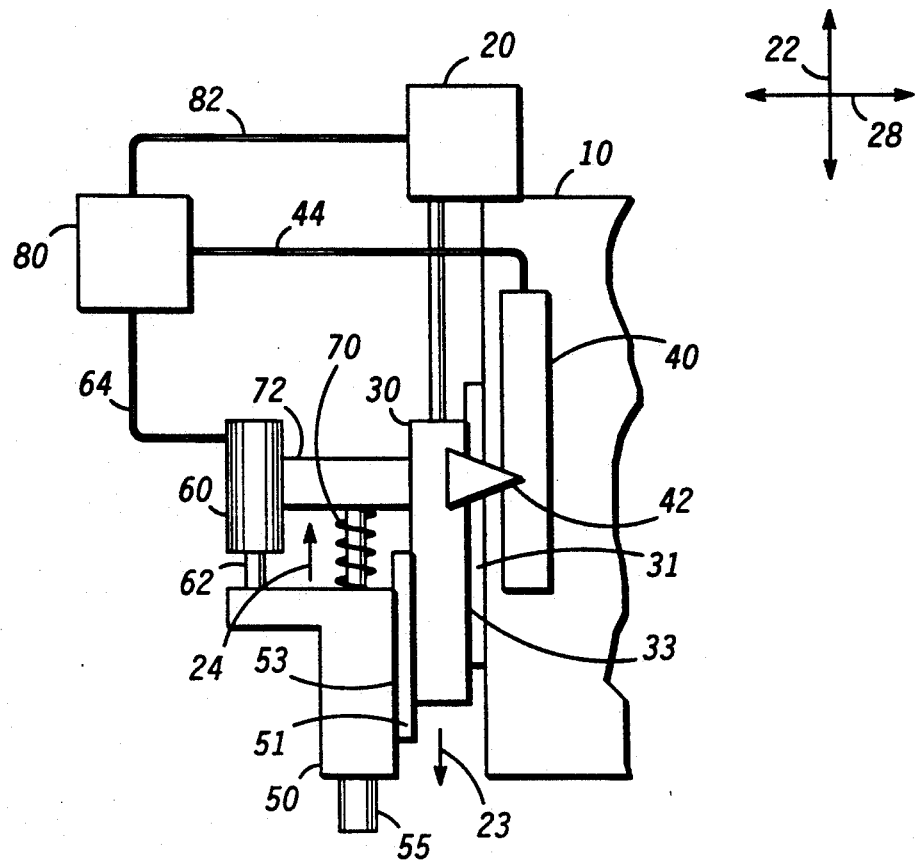
FIG. 1 illustrates a side view of an embodiment of the present invention.

FIG. 1 illustrates a side view of a bonding apparatus according to an embodiment of the present invention. The apparatus of the present invention controls the amount of deformation of a lead 90 and a bonding surface 93 (shown in FIGS. 2 and 3) during the bonding process. Deformation is controlled to a desired or constant amount, which results in the formation of consistently reliable bonds.

The bonding apparatus is comprised of a stationary bonder frame 10. A first stage 30 is mounted to bonder frame 10 by a support member 31, wherein first stage 30 has a means for allowing movement in a vertical direction 22 (shown by arrow 22 drawn vertical to a ground surface 28, which is represented by horizontal arrow 28). The means for allowing movement in vertical direction 22 is preferably comprised of a ball slide 33. However, other types of slides or means for allowing movement in vertical direction 22 may be used. A means for moving first stage 30 is mounted to first stage 30. The means for moving first stage 30 is preferably comprised of a motor 20, having a shaft 21 mounted to first stage 30.

A means for determining the position of first stage 30 with respect to a fixed point, in this embodiment, a fixed point on bonder frame 10, is coupled to first stage 30 and bonder frame 10. In a preferred embodiment, the means determining the position of first stage 30 is comprised of a glass scale 40 mounted on bonder frame 10 and a position indicator/encoder 42 mounted on first stage 30. Glass scale 40 sends an output signal 44 to a control system 80. Control system 80 will be further described below. The means for determining the position of first stage 30 can also be comprised of a transducer which senses the position of first stage 30 and provides an output signal to control system 80. Other suitable means may be used.

Mounted to first stage 30 is a second stage 50 having a means for allowing movement in vertical direction 22 opposite that of first stage 30. The means for allowing movement in vertical direction 22 is preferably a ball slide. Second stage 50 is mounted to first stage 30 by a support member 51.

A means for providing a resistance to the movement of second stage 50 is mounted to second stage 50 and first stage 30. The means for providing a resistance is preferably comprised of a compression spring 70. The spring rate of compression spring 70 is chosen to that a desired amount of force is applied in the bonding process (described below). Compression spring 70 is also mounted to first stage 30 by a support member 72. Other means of providing resistance can be used, such as a leaf spring. In the past, the amount of force that was applied during bonding was controlled and kept constant. This applied, constant force results in varying deformation of leads 90 and bonding surface 93 in different batches of leads 90 and bonding surfaces 93 that have variations in bond area or hardness of the material comprising the leads 90 and the bonding surfaces 93. In the present invention, the applied force is not constant.

A means for determining the position of second stage 50 relative to first stage 30 is coupled to second stage 50 and support member 72. In a preferred embodiment, the means for determining the position of second stage 50 is comprised of a position transducer 60 that indicates the position of compression spring 70. From that, the position of second stage 50 is known. Position transducer 60 has a portion 62 which moves freely up and down with second stage 50. Position transducer 60 is actuated by the movement of second stage 50 and provides an output signal 64 of the position of second stage 50 to control system 80. The means for determining the position of second stage 50 can also be comprised of other suitable means, such as a glass scale and a position indicator/encoder.

Figure 2:
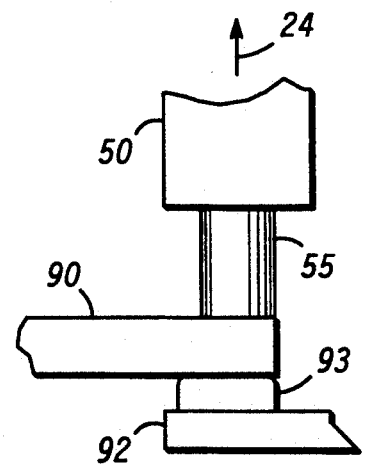
FIG. 2 illustrates a side view of a portion of a bonding process carried out using an embodiment of the present invention.
Figure 3:
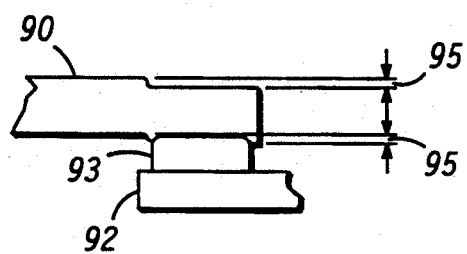
FIG. 3 illustrates a side view of a portion of a bonding process carried out using an embodiment of the present invention.

With reference to FIGS. 1, 2, and 3, a means for applying force to a lead 90 and a bonding surface or bump 93 adjacent to lead 90 and formed on a semiconductor chip 92 is mounted to second stage 50. In TAB bonding, a plurality of leads 90 are bonded with a plurality of bumps 93. Only one lead 90 and one bump 93 are shown in order to simplify the drawings. In a preferred embodiment, the means for applying force is comprised of a bonding tool 55 which makes physical contact with lead 90 which is attached to a TAB tape (not shown). This bonding tool 55 can be a thermode. The force of bonding tool 55 deforms or displaces lead 90 so that lead 90 makes physical contact or is bonded with bump 93, which is formed on semiconductor chip 92. Bump 93 is also deformed during the bonding process. Bonding tool 55 is also heated during the bonding process.

The bonding process will now be described with reference to FIGS. 1, 2, and 3 using the preferred embodiment of the bonding apparatus shown in FIG. 1. Motor 20 drives first stage 30 in vertical direction 22 in a downward direction 23 a first distance. Glass scale 40 determines the position of first stage 30 and sends output signal 44 to control system 80. Second stage 50 travels in downward direction 23 along with first stage 30 until bonding tool 55 touches the plurality of leads 90.

At this point, the position of first stage 30, or the distance travelled by first stage 30 is sensed by control system 80 and compression spring 70 begins to be compressed, allowing second stage 50 to move in vertical direction 22 in an upward direction 24 relative to first stage 30, opposite the motion of first stage 30. Position transducer 60 sends output signal 64 to control system 80 of the position of second stage 50, or a second distance travelled by second stage 50. Control system 80 algebraically adds the first distance and the second distance travelled by first stage 30 and second stage 50, which is equal to an amount of deformation 95 of lead 90 and bump 93 (see FIG. 3).

The movement of first stage 30 in downward direction 23 continues until the result of the algebraic addition or the amount of deformation 95 equals the amount of deformation or displacement of lead 90 and bump 93 that is desired. It is desirable for the resolution of glass scale 40 and position transducer 60 to be within 0:0000125 to 0.000025 centimeters in order to provide accuracy and reliability to the bonding process. When the desired amount of deformation is reached, control system 80 sends an output signal 82 to motor 20 to stop the movement of first stage 30. In a preferred embodiment, control system 80 is comprised of a differential amplifier that provides the means for doing the above steps.

By using the apparatus of the present invention, the amount of deformation 95 of lead 90 and bump 93 is controlled and held constant. The amount of deformation 95 is a critical parameter in controlling the bond strength. By controlling the amount of deformation 95 to a constant value, rather than controlling the amount of force, the effects of variations in the bond area and hardness of the materials are eliminated. The constant force bonding method results in under- or over- bonding due to these variations. In the prior art, downward motion 23 of first stage 30 was stopped after the proper force was reached. The force or bonding temperature had to be adjusted to account for the variation in the bond area and variation in the hardness of the materials. In the present invention, the deformation of lead 90 and bump 93 is held constant. The apparatus and method of the present invention allows for reliable bonds to be formed consistently.

We claim:

1. A method of bonding, comprising the steps of:
   providing a lead;
   providing a bonding surface formed on a semiconductor chip adjacent to the lead;
   bonding the lead to the bonding surface;
   measuring the amount the lead and the bonding surface are deformed;
   stopping the bonding of the lead to the bonding surface when the lead and the bonding surface are deformed a desired amount.

2. The method of claim 1 wherein bonding the lead to the bonding surface comprises using a bonding tool to bond the lead to the bonding surface; and wherein measuring the amount the lead and the bonding surface are deformed comprises sensing when the bonding tool touches the lead and sensing the movement of the bonding tool.

3. The method of claim 1 wherein bonding the lead and the bonding surface together comprises using a bonding apparatus comprised of a bonder frame;
   a first stage movably mounted to the bonder frame, having a means for moving a first distance in a first vertical direction with respect to a ground surface;
a means for determining the position of the first stage relative to a fixed point, which is coupled to the first stage;
a second stage movably mounted to the first stage, having a means for moving a second distance in a second vertical direction opposite that of the first vertical direction;
a means for applying a force to a lead and a bonding surface of a semiconductor chip to be bonded together, wherein the means for applying force is mounted to the second stage;
a means for determining the position of the second stage relative the the first stage, which is coupled to the second stage; and
a means for sensing when the means for applying force touches the lead and for algebraically adding the first vertical distance and the second vertical distance and for stopping the movement of the first stage when the result of the algebraic addition of the first distance and the second distance is equal to the desired amount of deformation of the lead and the bonding surface by the bonding tool, wherein the means for sensing is coupled to the means for determining the position of the first stage, the means for determining the position of the second stage, and the means for moving the first stage a first distance.

4. The method of claim 3 wherein the step of bonding the lead and the bonding surface further comprises using a differential amplifier as the means for sensing.

5. A bonding apparatus, comprised of:
a bonder frame;
a first stage movably mounted to the bonder frame, having a means for moving a first distance in a first vertical direction with respect to a ground surface;
a means for determining the position of the first stage relative to a fixed point, which is coupled to the first stage;
a second stage movably mounted to the first stage, having a means for moving a second distance in a second vertical direction opposite that of the first vertical direction;
a means for applying a force to a lead and a bonding surface of a semiconductor chip to be bonded together, wherein the means for applying a force is mounted to the second stage;
a means for determining the position of the second stage relative the the first stage, which is coupled to the second stage; and
a means for sensing when the means for applying force touches the lead and for algebraically adding the first vertical distance and the second vertical distance and for stopping the movement of the first stage when the result of the algebraic addition of the first distance and the second distance is equal to a desired amount of deformation of the lead and the bonding surface by the means for applying force, wherein the means for sensing is coupled to the means for determining the position of the first stage, the means for determining the position of the second stage, and the means for moving the first stage a first distance.

6. The apparatus of claim 5 wherein the means for sensing is comprised of a differential amplifier.

7. The apparatus of claim 5 wherein the means for allowing movement of the first and the second stage is comprised of a ball slide.

8. The apparatus of claim 5 wherein the means for moving the first stage a first distance is comprised of a motor.

9. The apparatus of claim 5 wherein the means for moving the second stage a second distance is comprised of a compression spring.

10. The apparatus of claim 5 wherein the means for determining the position of the first stage is comprised of a glass scale, a position indicator and an encoder.

11. The apparatus of claim 5 wherein the means for determining the position of the second stage is comprised of a position transducer.

12. The apparatus of claim 5 wherein the means for applying force is comprised of a bonding tool.

13. A tape automated bonding apparatus, comprising:
a bonder frame;
a first stage movably mounted to the bonder frame;
a motor coupled to the first stage for driving the first stage in a first distance;
a transducer coupled to the first stage for determining the position of the first stage relative to a fixed point on the bonder frame;
a second stage movably mounted to the first stage;
a compression spring mounted to the second stage and the first stage for allowing the second stage to move a second distance opposite that of the first distance;
a bonding tool for applying a force to a lead and a bonding surface of a semiconductor chip, wherein the bonding tool is mounted to the second stage;
a transducer coupled to the second stage for determining the position of the second stage relative the the first stage; and
a differential amplifier for sensing when the bonding tool touches the lead and for algebraically adding the first vertical distance and the second vertical distance and for stopping the movement of the first stage when the result of the algebraic addition of the first distance and the second distance is approximately equal to a constant amount of deformation of the lead and the bonding surface by the bonding tool, wherein the means for sensing is coupled to the means for determining the position of the first stage, the means for determining the position of the second stage, and the means for moving the first stage a first distance.

* * * * *